United States Patent [19]

Sasaki

[11] Patent Number: 5,294,013
[45] Date of Patent: Mar. 15, 1994

[54] PORTABLE ELECTRONIC APPARATUS

[75] Inventor: Katumaru Sasaki, Tokyo, Japan

[73] Assignee: Kabushiki Kaisha Toshiba, Kanagawa, Japan

[21] Appl. No.: 18,393

[22] Filed: Feb. 17, 1993

Related U.S. Application Data

[60] Continuation of Ser. No. 874,134, Apr. 27, 1992, abandoned, which is a division of Ser. No. 598,519, Oct. 17, 1990, abandoned.

[30] Foreign Application Priority Data

Oct. 20, 1989 [JP] Japan .................................. 1-271722

[51] Int. Cl.$^5$ .............................................. B65D 39/00
[52] U.S. Cl. .................................. 220/241; 220/4.02; 220/324
[58] Field of Search ............... 220/4.21, 4.02, 241, 220/254, 305, 324

[56] References Cited

U.S. PATENT DOCUMENTS

| | | | |
|---|---|---|---|
| 2,428,167 | 9/1947 | Linton | 220/241 X |
| 3,278,066 | 10/1966 | George et al. | 220/241 |
| 3,899,101 | 8/1975 | Keating et al. | 220/241 X |
| 4,402,624 | 9/1983 | Stahl et al. | 400/681 |
| 4,560,083 | 12/1985 | Danico | 220/241 X |
| 4,571,456 | 2/1986 | Paulsen et al. | 179/2 C |
| 4,742,478 | 5/1988 | Nigro, Jr. et al. | 364/708 |
| 4,749,364 | 6/1988 | Arney et al. | 439/372 |
| 4,819,829 | 4/1989 | Rosten et al. | 220/254 X |
| 4,895,231 | 1/1990 | Yamaguchi et al. | 190/115 |
| 4,901,261 | 2/1990 | Fuhs | 364/708 |
| 4,951,241 | 8/1990 | Hosoi et al. | 304/708 |
| 4,979,636 | 12/1990 | Daly | 220/324 |
| 5,031,791 | 7/1991 | Serio, Jr. | 220/324 X |

FOREIGN PATENT DOCUMENTS 0307892 3/1989 European Pat. Off. .
2175749A 12/1986 United Kingdom .

Primary Examiner—Steven M. Pollard
Attorney, Agent, or Firm—Finnegan, Henderson, Farabow, Garrett & Dunner

[57] ABSTRACT

A portable electronic apparatus includes a screw cover storing portion and a screw cover. The screw cover includes a thin portion and a thick portion. The thin portion is separated from the screw cover storing portion. The thin portion has a engaging claw for fixing the cover on the portion. When an operator pushes the thin portion, the thin portion is bent. When the thin portion is bent, the engaging claw is released from the cover. The cover is easy to remove from the screw cover storing portion.

25 Claims, 13 Drawing Sheets

PORTABLE ELECTRONIC APPARATUS

This application is a continuation, of application Ser. No. 07/874,134, filed Apr. 27, 1992, now abandoned, which is a division of Ser. No. 07/598,519 filed on Oct. 17, 1990 now abandoned.

BACKGROUND OF THE INVENTION

1. Field of the Invention

This invention relates to a portable electronic apparatus, such as a laptop computer or a portable word processor.

2. Description of the Related Art

A portable computer disclosed in U.S. Pat. No. 4,864,523, U.S. Pat. No. 4,895,231, U.S. Pat. No. 4,901,261 or U.S. Pat. No. 4,951,241 has a base unit and display unit pivotally connected to the base unit. The base unit has a keyboard. The display unit is able to rotate between a closed position where the display unit covers the keyboard and an open position where the keyboard is exposed and is able to be operated.

The portable computer has a U-shaped handle assembly. The handle assembly has a pair of legs slidably connected to the computer and a handle interconnecting with the legs. The handle assembly is able to slide between a stored position where the handle contacts the computer and the projected position where the handle is gripped by an operator. The computer has a pair of leg storing portion. The legs are almost wholly stored in the leg storing positions in the stored position, respectively. The computer which has a U-shaped handle assembly is big because the computer has two leg storing portions.

The computer has a floppy disk drive (FDD) and a hard disk drive (HDD). The FDD and HDD are disposed on a same inner surface in the computer, respectively. Consequently a width of the computer is not able to be smaller than a sum of widths of the FDD and HDD.

The computer has a tilt assembly which is slidably moved between a tilting position where the keyboard is tilted forwardly and a untilting position where the keyboard is not tilted. The tilt assembly is big because the tilt assembly is rotated between the tilting position and the untilting position.

The display unit has an outer case and an inner case. The outer case is coupled to the inner case be a screw. The screw is covered by a flexible resin cover. The resin cover is removably fixed to the display unit. But the resin cover is hard to remove from the display unit because the engagement of the resin cover and the display unit is tough.

The keyboard of the computer has character keys and function keys. The character keys and function keys are separated by partition wall. When the computer is small, the partition wall is thin. When the partition wall is thin, the wall bends. If the wall is bends, the wall contacts the keys and an ability of an operation of the keys is worse.

The computer has an expansion card storing portion. After an expansion card is installed in the portion, a resin cover covers the portion. But the cover is not electrically connected to the card. Consequently the expansion card generates an electromagnetic wave.

SUMMARY OF THE INVENTION

It is a first object of the present invention to provide a portable electronic apparatus having a small leg storing portion of a handle assembly.

It is a second object of the present invention to provide a portable electronic apparatus including a base unit having a floppy disk drive and a hard disk drive which is arranged on the floppy disk drive.

It is a third object of the present invention to provide a portable electronic apparatus having a small tilt assembly which is not rotated.

It is a fourth object of the present invention to provide a portable electronic apparatus having a flexible screw cover which is easy to remove from the computer and toughly engages the cover and the computer.

It is a fifth object of the present invention to provide a portable electronic apparatus including a keyboard having character keys and function keys and a thin partition which is prevented bending.

It is a sixth object of the present invention to provide a portable electronic apparatus having an expansion card storing portion and a cover which prevents generating a electromagnetic wave of an expansion card.

In order to achieve the first object, a portable electronic apparatus of the present invention comprises a base unit including a handle storing portion and a leg storing portion, T-shaped handle assembly including a leg which is stored in the leg storing portion and connected to the base unit and has a longitudinal axis and handle connecting portion and a handle which is stored in the handle storing portion and is slidably connected to the handle connecting portion. The handle is able to slide in a direction of the longitudinal axis and rotate between a stored position where the handle and the leg are stored in the handle storing portion and the leg storing portion, respectively, and projected position where handle is gripped by an operator. According to the apparatus of the present invention, the handle assembly is stored in a compact space because the handle is able to slide in the direction of the longitudinal axis.

In order to achieve the second object, a portable electronic apparatus of the present invention comprises a base unit which has a first mounting portion, a first disk drive which is mounted on the first mounting portion, a drive housing which has a second mounting portion, a second disk drive which is fixed on the first mounting portion, a first screw which fixes the first disk drive and the drive housing on the first mounting portion and a second screw which fixes the second disk drive on the second mounting portion. According to the portable electronic apparatus of the present invention, a width of the apparatus is not affected by widths of the first and the second disk drives.

In order to achieve the third object, a portable electronic apparatus of the present invention comprises a base unit having a tilt leg storing portion and a keyboard, a tilt leg which is slidably connected to the base unit between a tilting position where keyboard is tilted forwardly and a storing position where the tilt leg is stored in the tilt leg storing portion, a flexible board which is engaged the leg in the tilting position and the storing position and a switch releasing the engagement of the leg and the board. According to the apparatus of the present invention, the leg storing portion of the base unit is compact because the leg is not rotate.

In order to achieve the fourth object, a portable electronic apparatus of the present invention comprises a display unit including an outer case having a screw engaging portion and an inner case which has a cover storing portion having a cover storing surface having a through hole for screw and a cover engaging hole and a cover which has a thick portion and a thin portion having a claw which is engaged with the cover engaging hole. An inner surface of the thin portion is not contact with the storing surface. When the thin portion is pushed by an operator, the thin portion is bent. When the thin portion is bent, the claw which is engaged with the cover engaging hole is released from the cover engaging hole.

In order to achieve the fifth object, a portable electronic apparatus of the present invention comprises a base unit including a keyboard which has a character keys, function keys and a engaging hole and a front top cover which has a partition wall which has a engaging claw engaged with the engaging hole. When the front top cover is mounted on the keyboard, the engaging claw is engaged with the engaging hole and the partition wall is not bent.

In order to achieve the sixth object, a portable electronic apparatus of the present invention, comprises a base unit including a card storing portion having a first connector which is electrically connecting an expansion card and a first inner surface, a cover which covers the card storing portion and has a second inner surface having a spring. The spring pushes and fixes the expansion card in a direction of the first inner surface and electrically connects the expansion card and the cover.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiments given below, serve to explain the principle of the invention.

DETAILED DESCRIPTION OF THE PREFERRED EMBODIMENTS

Figure 1:
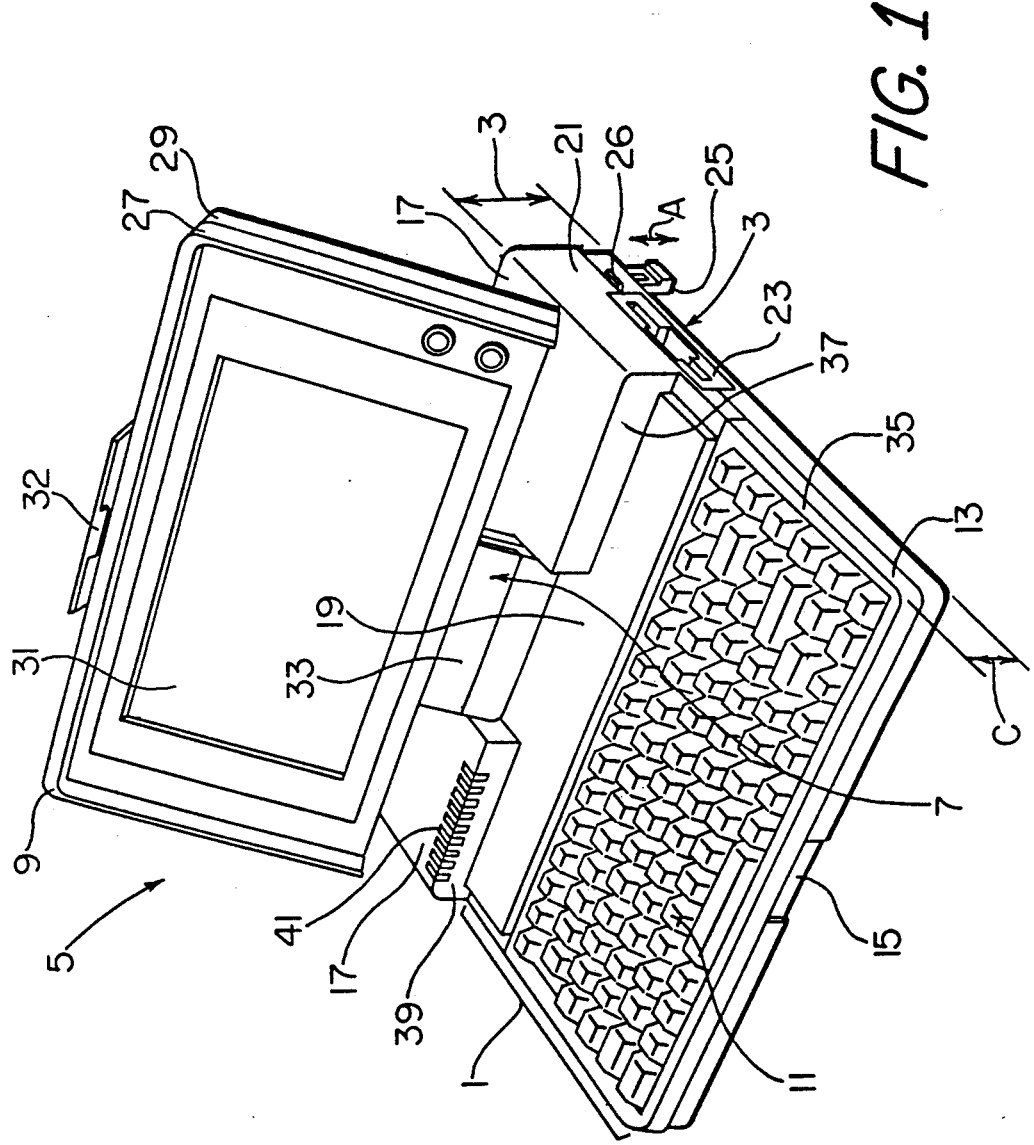
FIG. 1 is a perspective view of a laptop computer according to an embodiment of the present invention.

FIG. 1 is a perspective view of a laptop computer.

A laptop computer 5 has a base unit 3 and a display unit 9. Base unit 3 has a front portion 1. A keyboard 11 and a front top cover 13 are fixed on the front portion 1. A handle assembly 15 is pivotally connected to a front end of the base unit 3. Base unit 3 has a rear top surface 17 and a display leg mounting surface 19. A side wall 21 of base unit 3 has a floppy disk drive (FDD) 23 and a tilt leg release switch 26. A rear portion of a bottom surface of base unit 3 has a tilt leg 25. Tilt leg 25 is slidable in a direction of an arrow A. Base unit 3 has a right center wall 37 and a left center wall 39. Light electroluminescence devices (LEDs) 41 are mounted in a corner between left center wall 39 and rear top surface 17. Display unit 9 has a display leg 7. Display leg 7 is mounted on mounting surface 19. Display unit 9 is pivotally connected to base 3 by display leg 7. Display unit 9 has an inner case 27, an outer case 29, display surface 31, a display latch claw 32 and a screw cover 33. Screw cover 33 is removably fixed on display leg 7. A height B between rear top surface 17 and the bottom surface of base unit 3 is higher than a height C between a front top surface 35 and the bottom surface.

Figure 2:
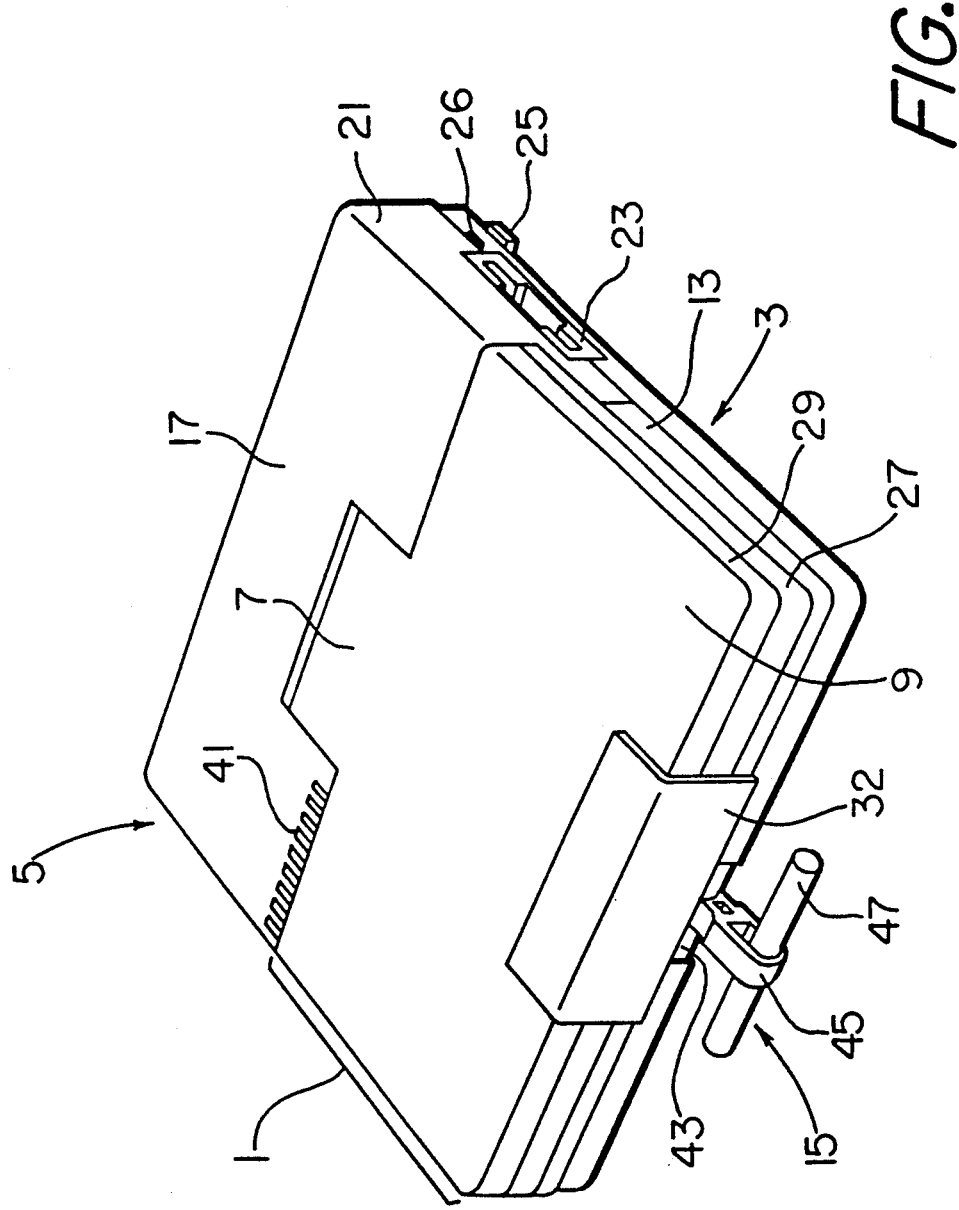
FIG. 2 is a perspective view of the laptop computer when a display unit is set in a closed position, a handle assembly is set in a projecting position and a tilt leg assembly is set in a stored position.

FIG. 2 is a perspective view of the laptop computer when the display unit 9 is set in a closed position, the handle assembly 15 is set in a projecting position and the tilt leg 25 is set in a stored position.

Display unit 9 rotates between an open position (shown in FIG. 1) for exposing and operating keyboard 11 and a closed position (shown in FIG. 2) for covering keyboard 11. When display unit 9 is set in the closed position, an outer surface of outer case 29 and rear top surface 17 are maintained at a common height level. Tilt leg 25 slides between a tilting position (shown in FIG. 1) for tilting keyboard 11 forwardly and an stored position (shown in FIG. 2) for untilting keyboard 11. Handle assembly 15 has a handle axis portion 43, a leg portion 45 which is fixed to handle axis portion 43 and handle portion 47 which is slidably connected to leg portion 45. Handle assembly 15 rotates between a storing position (shown in FIG. 1) for storing handle assembly 15 and a projecting position (shown in FIG. 2) for gripping handle portion 47.

Figure 3:
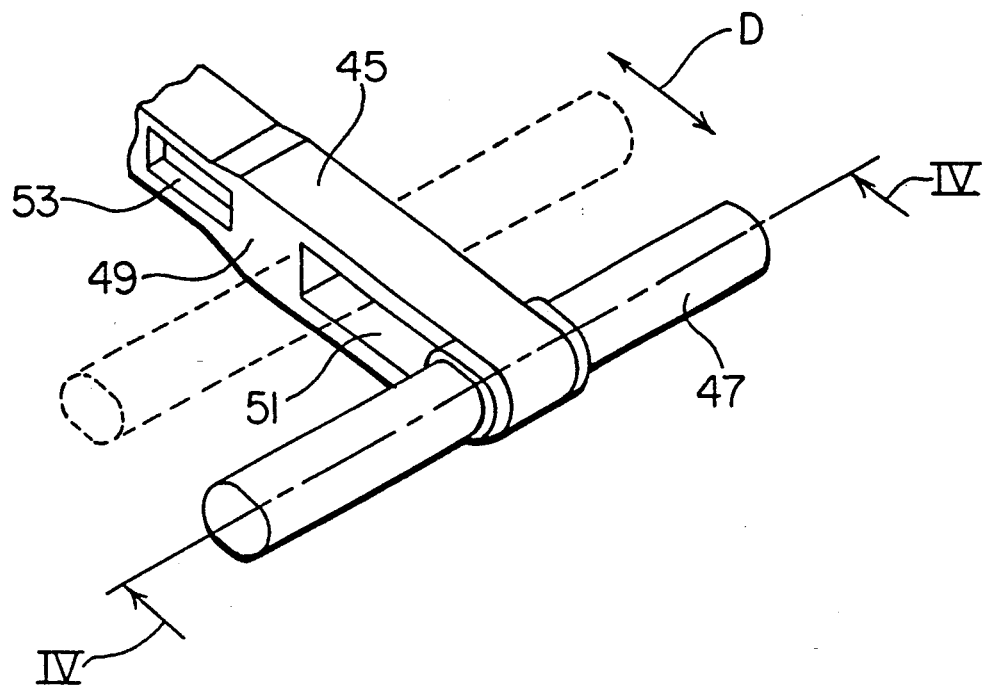
FIG. 3 is a perspective view for explaining a movement of a handle of the handle assembly.

FIG. 3 is a perspective view for explaining a movement of the handle assembly.

A side surface 49 of leg portion 45 has a rectangle hole 51 and an engaging groove 53. Handle portion 47 is slidably connected to rectangle hole 51. Handle portion slides between a handle gripping position (shown by a continuous line) and handle storing position (shown by a dotted line).

Figure 4:
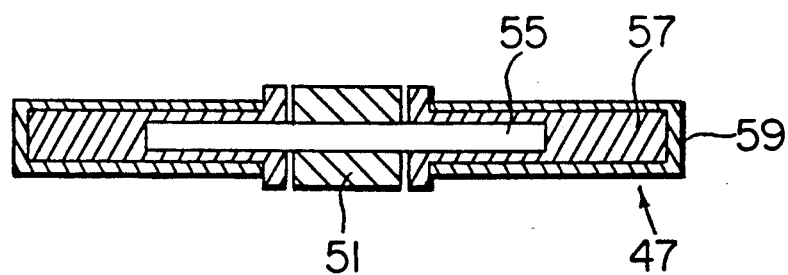
FIG. 4 is a sectional view taken along line IV—IV of FIG. 3.

FIG. 4 is a sectional view taken along line IV—IV of FIG. 3.

Handle portion 47 has a metal axis portion 55, a resin portion 57 for connecting metal axis portion in rectangle hole 51 and a rubber portion 57 covering resin portion 57.

Figure 5:
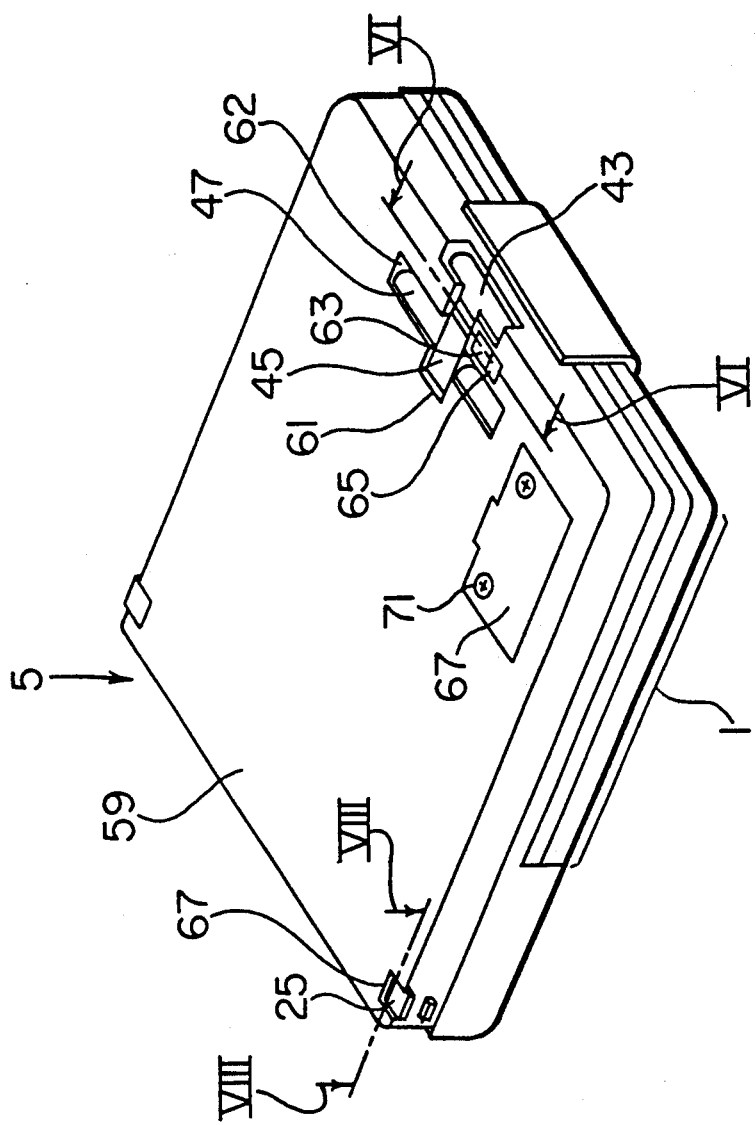
FIG. 5 is a perspective bottom view of FIG. 2.

FIG. 5 is a perspective bottom view of FIG. 2.

A bottom surface 59 of base unit 3 has a leg storing groove 61 and a handle storing groove 62 in a front end. Handle portion 47 is stored in groove 62 in the handle storing position. In the front end, bottom surface 59 has a switch storing portion 65 and a release switch 63 stored in switch storing portion 65. A rear end of bottom surface 59 has a pair of tilt leg storing portions 67. A card storing portion cover 69 is fixed on bottom surface 59 by screw 71.

Figure 6A:
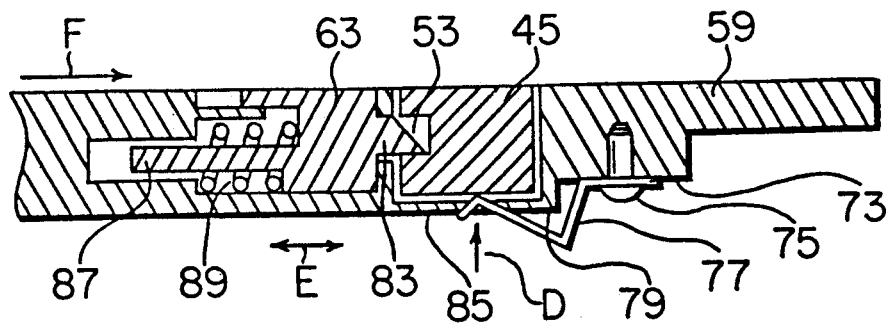
FIG. 6A–6C are sectional views taken along line VI—VI of FIG. 5 for explaining a movement of the handle assembly.
Figure 6B:
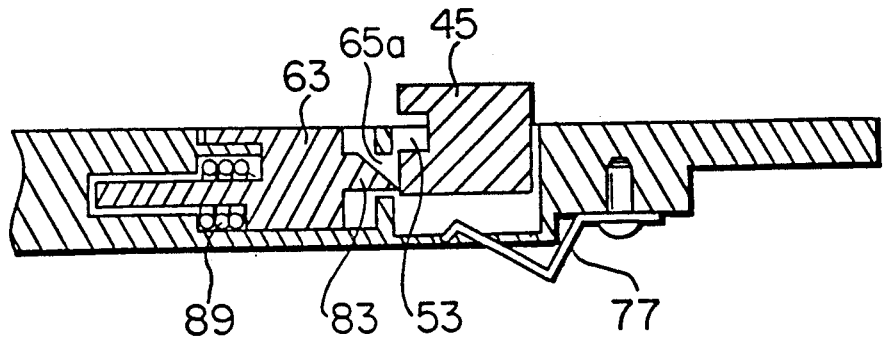
Figure 6C:
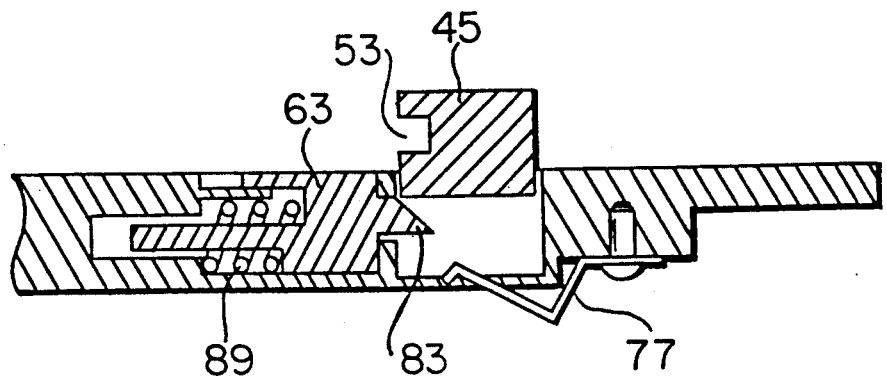

FIG. 6A–6C are sectional views for explaining a movement of the handle assembly.

FIG. 6A is a sectional view taken along line VI—VI of FIG. 5. One end of a flat spring 77 is fixed on an inner surface 73 of base unit 3 by a screw 75. Inner surface 73 has an opening 79. The other end of flat spring 77 inserted in opening 79. The other end of spring 77 pushes leg portion 45 in a direction of an arrow D. Switch storing portion 65 has a side opening 65a. One end of release switch 63 has a latch claw 83. Latch claw 83 is inserted in side opening 65a. Latch claw 83 is engaged with engaging groove 53. Release switch 63 is slidable in a direction of an arrow E. The other end of release switch 63 has a spring holder 87. A coil spring 89 is wound around spring holder 87. Coil spring 89 pushes release switch 63 in a direction of an arrow F. When an operator slides release switch 63, as shown in FIG. 6B, latch claw 83 is released from engaging groove 53. Coil spring 89 is contracted. When latch claw 83 is released, leg portion 45 projects from leg storing groove 61 by a force of flat spring 77. When the operator releases switch 63, as shown in FIG. 6C, release switch 63 returns to a position shown in FIG. 6A by a force of coil spring 89.

Figure 7:
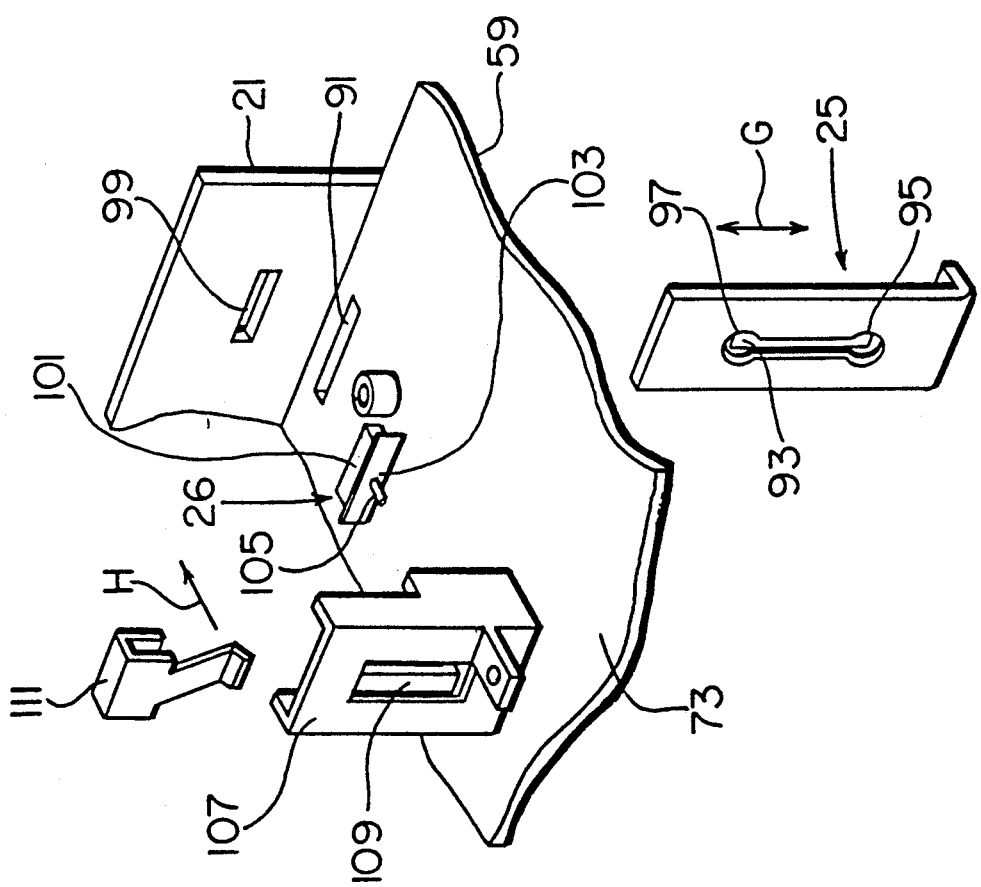
FIG. 7 is an exploded perspective view of a tilt leg assembly.

FIG. 7 is an exploded perspective view of tilt leg assembly.

Bottom surface 59 has a slit 91. Tilt leg 25 is inserted in slit 91. Tilt leg has a slit 93. One end of slit 93 has a first groove 95 for fixing tilt leg 25 in the stored position. The other end of slit 93 has a second groove 97 for fixing tilt leg 25 in the tilting position. Side wall 21 has a slit 99 for inserting release switch 26. Tilt leg release switch 26 has a head portion 101, a stopper portion 103 and a projecting portion 105. Head portion 101 is inserted in slit 99 and projected from side wall 21. Stopper portion 103 prevents release switch 26 falling out from slit 99. A leg holder 107 slidably supports tilt leg 25 in a direction of an arrow G. Leg holder 107 includes a elastic portion 109 having a engaging portion which is engaged in first and second grooves 95, 97. A flat spring 111 is fixed on leg holder 107. Flat spring 111 pushes the engaging portion in a direction of an arrow H. Leg holder 107 is fixed on inner surface 73 of base unit 3.

Figure 8C:
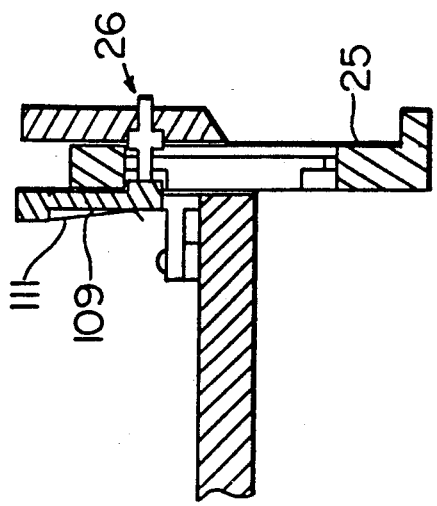
FIG. 8A–8C are sectional views taken along line VIII—VIII of FIG. 5 for explaining a movement of the tilt leg assembly.
Figure 8B:
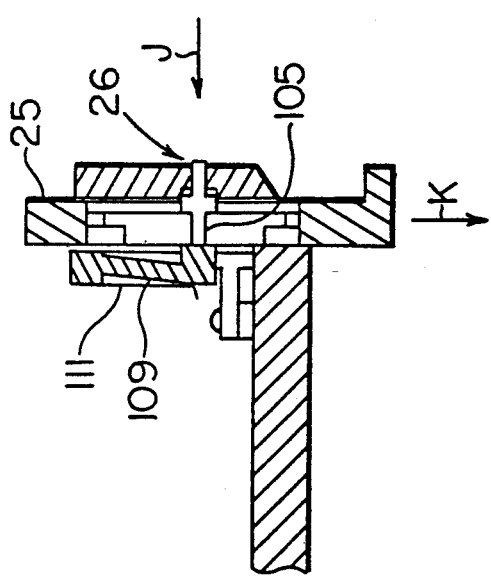
Figure 8A:
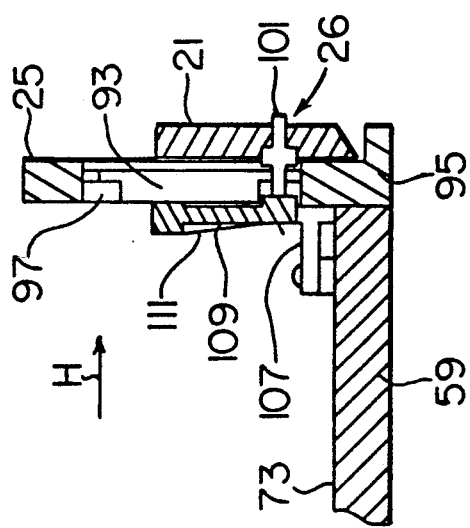

FIGS. 8A–8C are sectional views for explaining a movement of the tilt leg assembly.

FIG. 8A is a sectional view taken along line VIII—VIII of FIG. 5. When tilt leg 25 is stored in the storing position, the engaging portion of elastic portion 109 is engaged with first groove 95. Tilt leg fixed in the storing portion because the engaging portion is pushed in a direction of an arrow H by flat spring 111. When an operator pushes head portion 101 of release switch 26 in a direction of an arrow J, as shown in FIG. 8B, projecting portion 105 pushes the engaging portion of elastic portion 109 and the engaging portion is released from first groove 95. When the engaging portion is released, tilt leg 25 is able to be slided in a direction of an arrow K. When the operator slides tilt leg 25 in the direction of the arrow K, the engaging portion of elastic portion 109 is inserted in and engaged with second groove 97 by spring 111.

Figure 9:
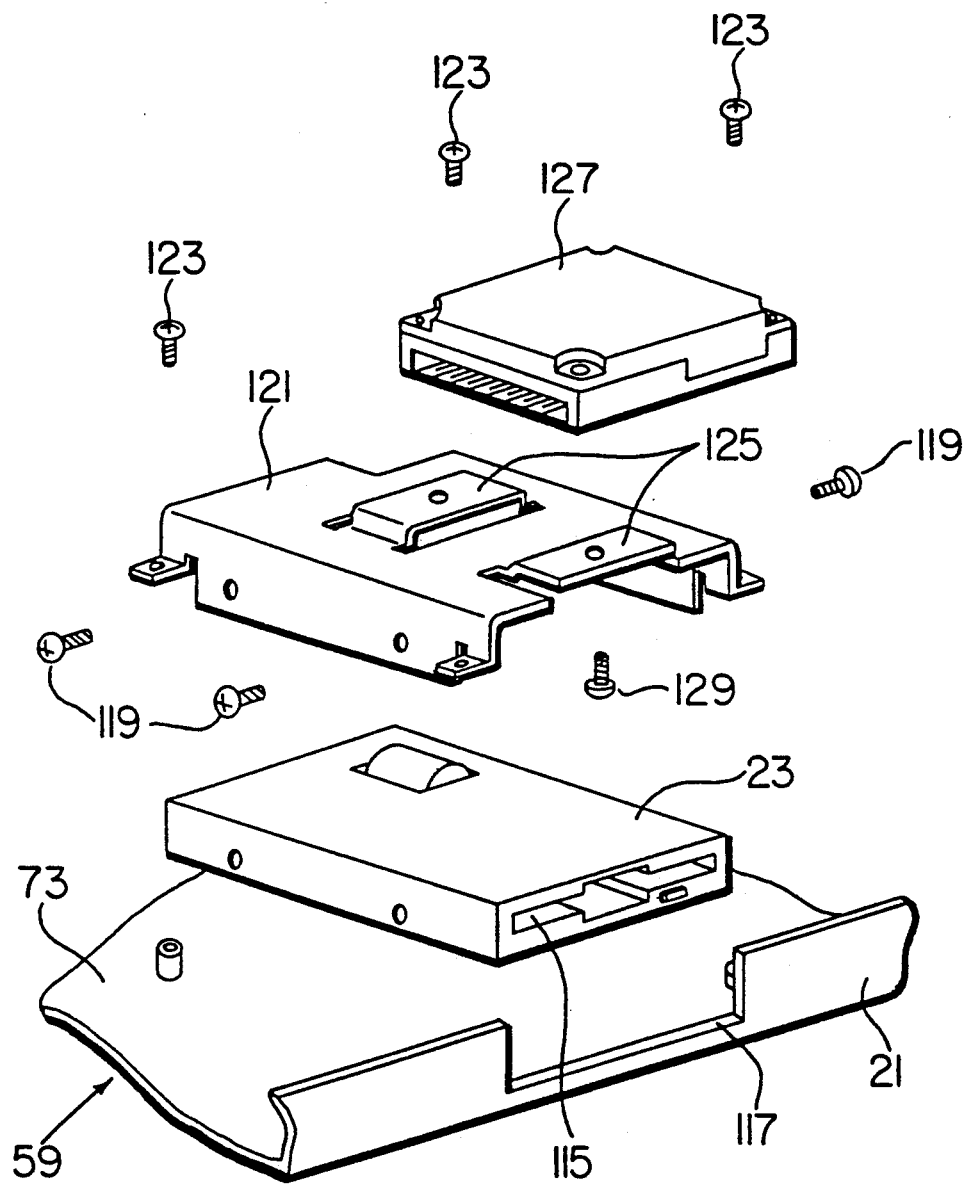
FIG. 9 is an exploded perspective view of a disk drive assembly.

FIG. 9 is an exploded perspective view of a disk assembly.

Side wall 21 of base unit 3 has a hole 117 for exposing a disk inserting portion 115 of 3.5 inches FDD 23. FDD 23 is fixed in drive housing 121 by screws 119. Drive housing 121 is fixed on inner surface 73 by screws 123. Drive housing 121 has a pair of hard disk mounting surfaces 125. A 2.5 inches hard disk drive (HDD) 127 is fixed on mounting surfaces 125 by screw 129. FDD 23 and HDD 127 is fixed on the same drive housing 121. Consequently a space of the disk assembly is compact.

Figure 10:
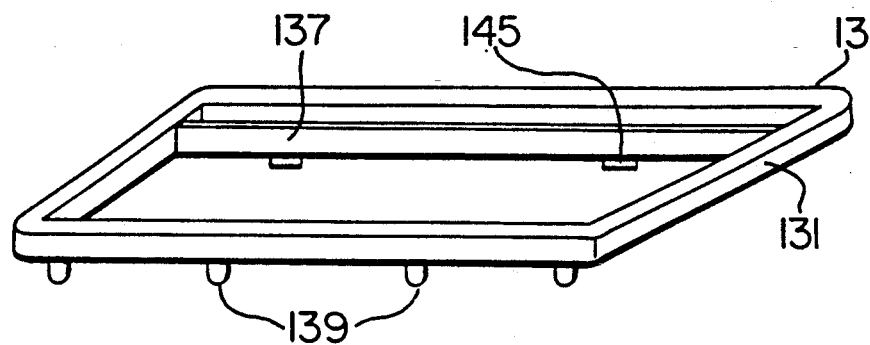
FIG. 10 is a perspective view of a front top cover.
Figure 11:
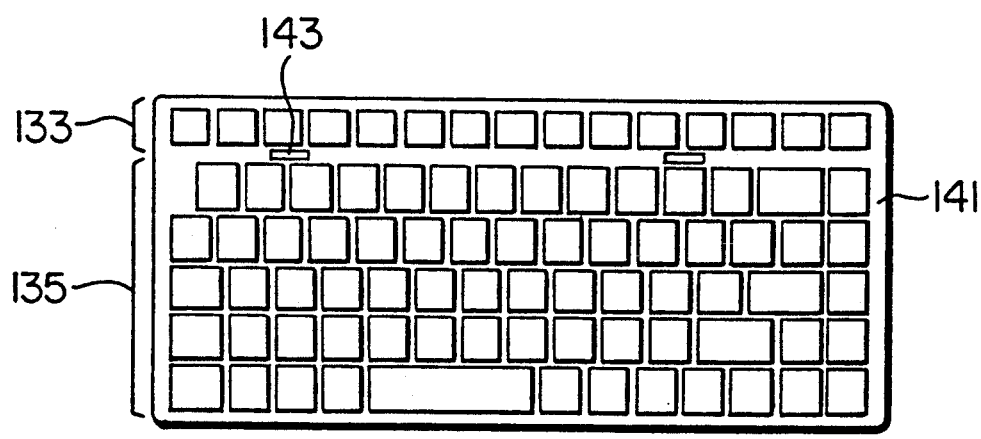
FIG. 11 is a top view of a keyboard.

FIG. 10 is a perspective view of a front top cover and FIG. 11 is a top view of a keyboard.

Front top cover 13 includes an outer frame 131 having screw engaging bosses 139 and an partition wall 137, for separating function keys 133 and character keys 135 of keyboard 11, having a pair of engaging claws 145. A plate 141 of keyboard 11 has a pair of engaging grooves 143. When keyboard 11 and front top cover 13 are assembled on base unit 3, engaging claws 145 are engaged with engaging grooves 143. Consequently, even though partition wall is thin, partition wall is prevented bending.

Figure 12:
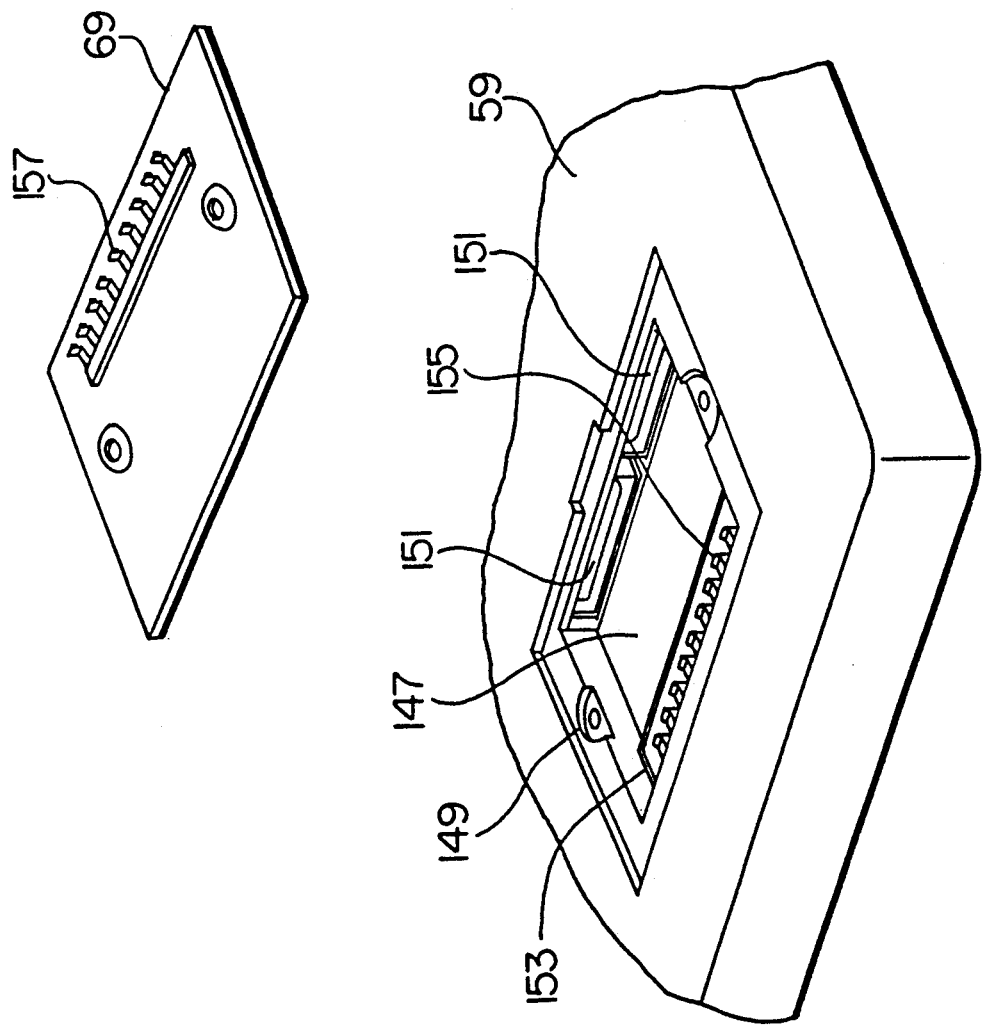
FIG. 12 is a perspective view of a card storing portion and a storing portion cover.
Figure 13:
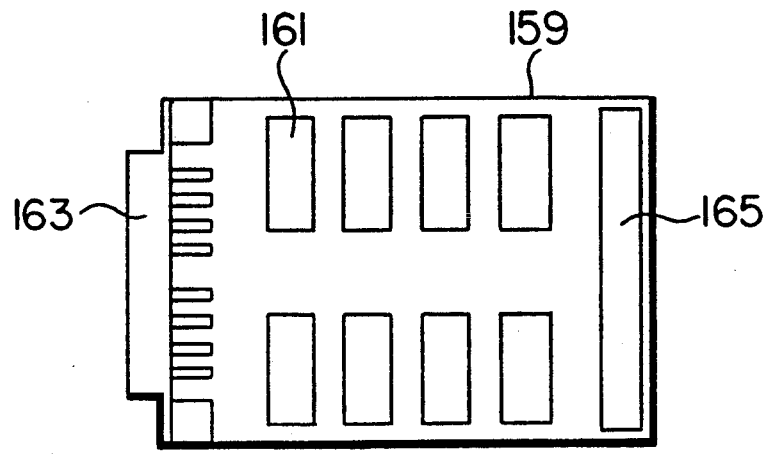
FIG. 13 is a top view of an expansion card.

FIG. 12 is a perspective view of a card storing portion of the base and the card storing portion cover and FIG. 13 is a top view of an expansion card.

Bottom surface 59 of base unit 3 has an expansion card storing portion 147. Storing portion 147 is coated by an electric conducting material. One side of storing portion 147 has connectors 151 fixed on the inner surface of base unit 3. Opposite side of storing portion 147 has a card mounting wall 153 and a stopper claws 155 for preventing an expansion card slipping. Card storing portion cover 69 has a flat metal spring 157 fixed on an inner surface of cover 69. Cover 69 is an electric conductor. An expansion card 159 has a connector 163 connected to connectors 151, expansion memories 161 and an electric conducting plate 165.

Figure 14:
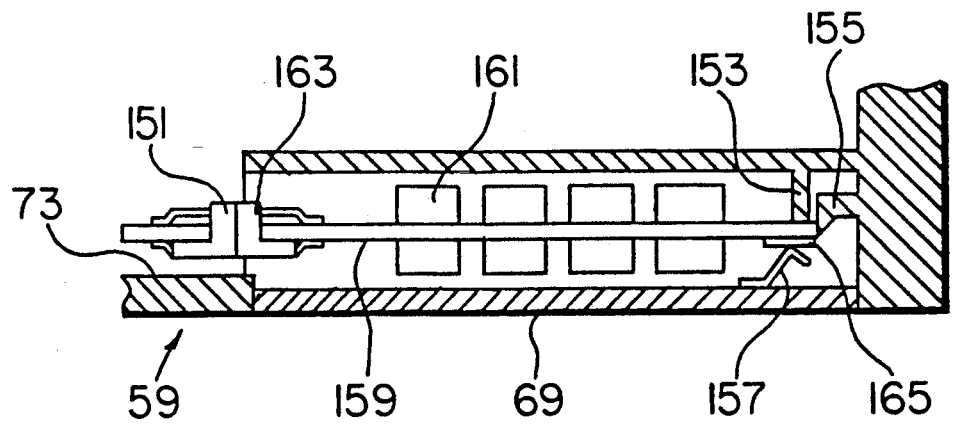
FIG. 14 is a sectional view for explaining a storing condition of the expansion card.

FIG. 14 is a sectional view for explaining a storing condition of the expansion card.

When expansion card is stored in storing portion 147 and cover 69 is fixed on bottom surface 59 by screw 71, spring 157 is contacted to conducting plate 165 and pushes card 159 on card mounting wall 153. Inner surface 73 is coated by the electric conducting material. Consequently expansion card is electrically connected to base unit 3 through plate 165, spring 157, cover 69 and screw 71 and an electromagnetic wave is prevented.

Figure 15:
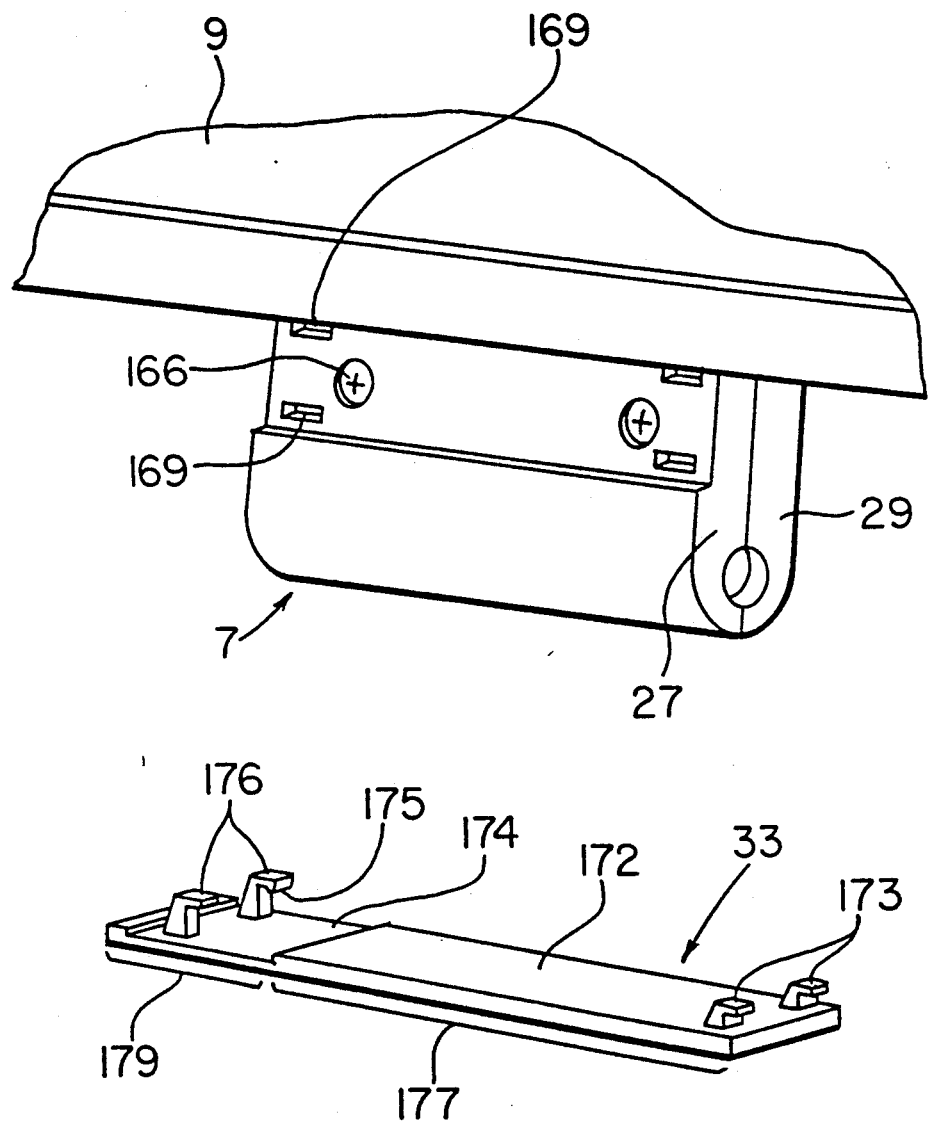
FIG. 15 is a perspective view of a display leg and a screw cover.

FIG. 15 is a perspective view of a display leg and a screw cover.

Inner cover 27 includes a cover storing portion having through holes and engaging holes 169. Outer cover 29 has screw engaging portion. Inner cover 27 and outer cover 29 are engaged by screws 166. Screw cover 33 has a thick portion 177 and a thin portion 179. An inner surface 172 of thick portion 177 has a pair of supporting claws 173. An inner surface 174 of thin portion 179 has a pair of engaging claws 176 having a engaging portion 175, respectively. Inner surface 172 is contacted with cover a surface of the cover storing portion. Inner surface 174 is not contacted with the surface.

Figure 16A:
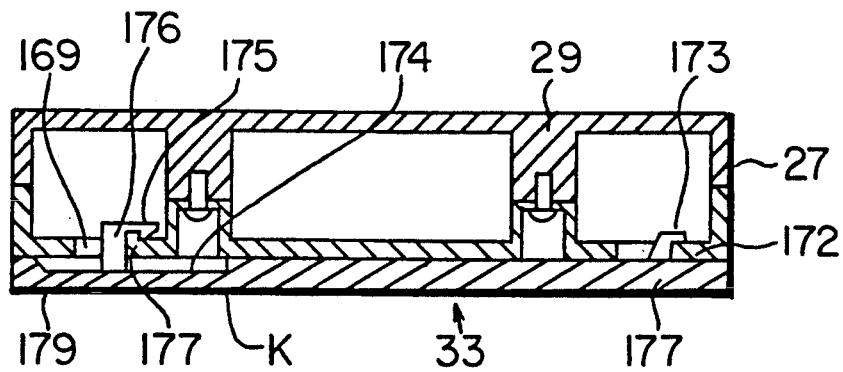
FIG. 16A–16C are sectional views for explaining a movement of a claw of the screw cover.
Figure 16B:
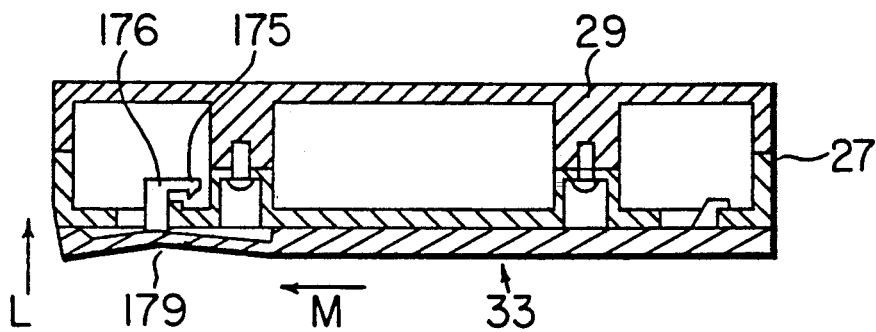
Figure 16C:
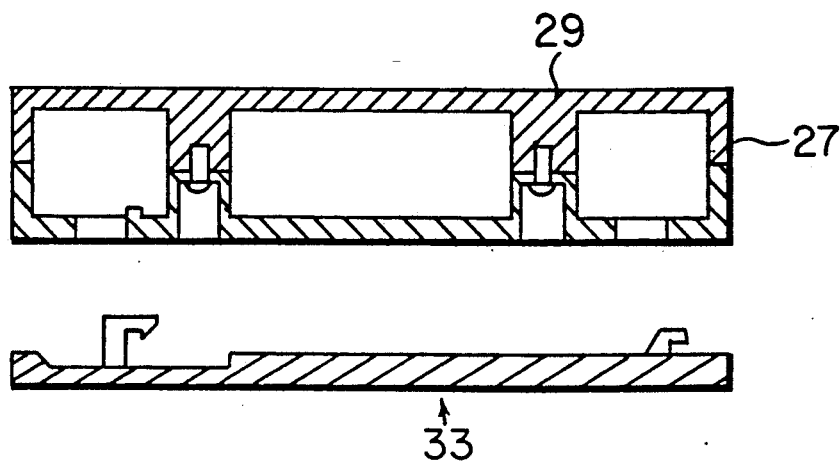

FIGS. 16A–16C are sectional views for explaining a movement of the screw cover.

When screw cover is fixed on the cover storing portion, as shown in FIG. 16A, a space K is formed between inner surface 174 and the surface of the cover storing portion. Engaging portions 175 are engaged with an inner surface of inner case 27. Supporting claws 173 are supported on the inner surface of inner case 27. When an operator pushes thin portion 179 in a direction of an arrow L, as shown in FIG. 16B, thin portion 179 is bent. When thin portion 179 is bent, engaging portions 175 is released from the inner surface of the cover storing portion. In this condition, if the operator slides cover 33 in a direction of an arrow M, cover 33 is released from inner case 27.

What is claimed is:

1. A portable electronic apparatus comprising:
   an outer case including a screw engaging portion;
   an inner case, fixed to the outer case, including a screw cover storing portion having a bottom surface, a through hole, a cover engaging portion and a cover support portion;
   a screw cover, stored on the screw cover storing portion, including a thick portion having a first inner surface, contacted on the bottom surface, having a support claw supported on the cover support portion, and a thin portion having a second inner surface, being separated from the bottom surface when the cover is stored on the storing portion, having a engaging claw engaged with the cover engaging portion.

2. A portable electronic apparatus according to claim 1, wherein the engaging claw is released from the cover engaging portion when the thin portion is pushed and is bent.

3. A portable electronic apparatus according to claim 2, wherein the screw cover further comprises a longitudinal axis and the screw cover is removed from the inner case when the screw cover is moved in a direction of the longitudinal axis after the thin portion is bent.

4. A portable electronic apparatus comprising:
   an outer case including a screw engaging portion;
   an inner case, fixed to the outer case, including a screw cover stirring portion having a bottom surface, a through hole, a cover engaging portion and a cover support portion;
   a screw cover stored on the screw cover storing portion, including a thick portion having a first inner surface, contacted on the bottom surface, having a support claw supported on the screw cover support portion, and a thin portion having a second inner surface, being separated from the bottom surface when the screw cover is stored on the storing portion, having an engaging claw engaged with the screw cover engaging portion.

5. A portable electronic apparatus as claimed in claim 4, wherein the engaging claw is released from the screw cover engaging portion when the thin portion is pushed and is bent.

6. A portable electronic apparatus as claimed in claim 4, wherein the cover further comprises a longitudinal axis and the screw cover is removed from the inner case when it is moved in a direction of the longitudinal axis after the thin portion is bent.

7. A portable electronic apparatus comprising:
   an outer case, an inner case, the inner case including a facing surface having a cover engaging portion and a through hole;
   a screw fixing the outer case and the inner case through the through hole; and
   a screw cover removably stored on the facing surface, including a cover surface facing to the facing surface, a bendable portion configured to be manually pushed for bending the screw cover in a vertical direction to the facing surface, and a longitudinal axis, the cover surface including an engaging claw engaged with the cover engaging portion, the engagement of the engaging claw and the engaging portion being released when the bendable portion is bent, the screw cover being moved in a direction of the longitudinal axis after the bendable portion is bent so as to remove the screw cover from the facing surface.

8. A portable electronic apparatus as claimed in claim 7, wherein the facing surface has a cover supporting portion, wherein the screw cover includes a thick portion having a supporting claw supported with the cover supporting portion and wherein said bendable portion comprises a thin portion having the engaging claw.

9. A portable electronic apparatus as claimed in claim 7, wherein the engaging claw is released from the screw cover engaging portion when the bendable portion is pushed and is bent.

10. A portable electronic apparatus comprising:
    a display unit having a leg and including an outer case having an outer leg cover portion and an inner case having an inner leg cover portion, the inner leg cover portion having a cover engaging portion and a through hole;
    a screw fixing the outer leg cover portion and the inner leg cover portion through the through hole; and
    a screw cover removably stored on the inner leg cover portion, including having a first portion having a first thickness and an engaging claw engaged with the cover engaging portion, and a second portion having a second thickness being different from the first thickness.

11. A portable electronic apparatus as claimed in claim 10, wherein the inner leg cover portion having a cover supporting portion, wherein the second portion having a supporting claw supported with the cover supporting portion, and a first portion being separated from the inner leg cover portion when the second portion of the screw cover fixed on the inner leg cover portion.

12. A portable electronic apparatus as claimed in claim 10, wherein the engaging claw is released from the cover engaging portion when the first portion is pushed and is bent.

13. A portable electronic apparatus as claimed in claim 10, wherein the screw cover further comprises a longitudinal axis and the screw cover is removed from the inner leg cover portion when the screw cover is moved in a direction of the longitudinal axis after the first portion is bent.

14. A portable electronic apparatus comprising:
    a display unit having a leg and including an outer case having an outer leg cover portion and an inner case having an inner leg cover portion, the inner leg cover portion having a cover engaging portion and a through hole;
    a screw fixing the outer leg cover portion and the inner leg cover portion through the through hole; and
    a screw cover removably stored on the inner leg cover portion, including a inner surface, an engaging claw engaged with the cover engaging portion and a stepped portion for separating the inner surface from the inner leg cover portion.

15. A portable electronic apparatus as claimed in claim 14, wherein the inner leg cover portion has a cover supporting portion, wherein the screw cover has a thin portion and a thick portion having a supporting claw supported with the cover supporting portion, and wherein the stepped portion separates the thin portion from the thick portion.

16. A portable electronic apparatus as claimed in claim 15, wherein the engaging claw is released from the screw cover engaging portion when the thin portion is pushed and is bent.

17. A portable electronic apparatus as claimed in claim 14, wherein the cover further comprises a longitudinal axis and the screw cover is removed from the inner case when the screw cover is moved in a direction of the longitudinal axis after the thin portion is bent.

18. A portable electronic apparatus comprising:
a display unit having a leg and including an outer case having an outer leg cover portion and an inner case having an inner leg cover portion, the inner leg cover portion having a cover engaging portion and a through hole;
a screw fixing the outer leg cover portion and the inner leg cover portion through the through hole; and
a screw cover removably stored on the inner leg cover portion, including having a deflecting portion having a engaging claw engaged with the engaging portion and a non-deflecting portion, the deflecting portion being separated from the inner leg cover portion when the screw cover stored on the inner leg cover portion.

19. A portable electronic apparatus as claimed in claim 18, wherein the inner leg cover portion has a cover supporting portion, wherein the non-deflecting portion has a supporting claw supported with the cover supporting portion.

20. A portable electronic apparatus as claimed in claim 18, wherein the engaging claw is released from the cover engaging portion when the deflecting portion is pressed and is bent.

21. A portable electronic apparatus as claimed in claim 18, wherein the cover further comprises a longitudinal axis and the screw cover is removed from the inner leg cover portion when the screw cover is moved in a direction of the longitudinal axis after the deflecting portion is bent.

22. A portable electronic apparatus comprising:
an outer case, an inner case, the inner case including a facing surface having a cover engaging portion and a through hole;
a screw fixing the outer case and the inner case through the through hole; and
a screw cover removably stored on the facing surface, including a cover surface facing to the facing surface, a bendable portion configured for manual pushing for bending the screw cover in a vertical direction to the facing surface, and a longitudinal axis, the cover surface including an engaging claw engaged with the cover engaging portion.

23. A portable electronic apparatus as claimed in claim 22, wherein the facing surface having a cover supporting portion, wherein the screw cover includes a thick portion having a supporting claw supported with the cover supporting portion and wherein said bendable portion comprises a thin portion having the engaging claw.

24. A portable electronic apparatus as claimed in claim 23, wherein the cover further comprises a longitudinal axis and the screw cover is removed from the inner case when the screw cover is moved in a direction of the longitudinal axis after the bendable portion is bent.

25. A portable electronic apparatus as claimed in claim 22, wherein the engaging claw is released from the screw cover engaging portion when the bendable portion is pushed and is bent.

* * * * *

UNITED STATES PATENT AND TRADEMARK OFFICE
CERTIFICATE OF CORRECTION

PATENT NO. : 5,294,013
DATED : March 15, 1994
INVENTOR(S) : Katumaru Sasaki

It is certified that error appears in the above-indentified patent and that said Letters Patent is hereby corrected as shown below:

Claim 1, column 7, line 20, change "suppored" to --supported--.

Claim 11, column 8, line 36, change "having" to --has--.

line 38, change "having" to --has--;

line 39, change "being" to --is--.

Claim 23, column 10, line 23, change "having" to --has--.

Signed and Sealed this

Fourth Day of April, 1995

Attest:

BRUCE LEHMAN

Attesting Officer     Commissioner of Patents and Trademarks